United States Patent [19]

Celi

[11] Patent Number: 5,252,189
[45] Date of Patent: Oct. 12, 1993

[54] METHOD OF PROCESSING USED APPLIANCE BATTERIES

[76] Inventor: Antonio M. Celi, Im Engelsgarten 2, D-5466 Neustadt, Fed. Rep. of Germany

[21] Appl. No.: 812,702

[22] Filed: Dec. 23, 1991

[51] Int. Cl.⁵ .......................... C25B 1/22; C25C 1/16; H01M 6/50
[52] U.S. Cl. .................. 204/104; 204/105 R; 75/403; 429/49
[58] Field of Search ................ 204/104, 105 R, 141.5; 429/49; 75/403

[56] References Cited

U.S. PATENT DOCUMENTS

| | | | |
|---|---|---|---|
| 3,821,026 | 6/1974 | Swartz | 75/403 |
| 4,769,116 | 9/1988 | Olper et al. | 429/49 X |
| 4,828,661 | 5/1989 | Celi | 204/141.5 |
| 5,106,466 | 4/1992 | Olper et al. | 429/49 X |

FOREIGN PATENT DOCUMENTS

| | | |
|---|---|---|
| 0069117 | 1/1983 | European Pat. Off. |
| 0075978 | 4/1983 | European Pat. Off. ............. 75/403 |
| 0117865 | 9/1984 | European Pat. Off. |
| 3009394 | 4/1982 | Fed. Rep. of Germany |
| 3709967 | 10/1988 | Fed. Rep. of Germany |
| 0030636 | 2/1986 | Japan ....................... 75/403 |
| 2210386 | 6/1989 | United Kingdom |

Primary Examiner—Donald R. Valentine
Attorney, Agent, or Firm—Helfgott & Karas

[57] ABSTRACT

Used appliance batteries are subjected to a thermal-mechanical treatment in a closed container at a temperature at which, with the assistance of mechanical pressure and/or impact, metal-plastics and metal-metal bonds are disrupted. Then, after the metal parts, the synthetic plastics parts and graphite electrodes are separated by conventional physical separating methods, vaporized mercury is extracted and washed with sulphuric acid in a washing device and any metal salts are brought into solution and processed by ion exchange. The treatment is carried out in an apparatus which includes a heatable container provided with a closable charging aperture, a discharge orifice and with feed and discharge lines for inert gas. A gas washing device for the inert gas leaving the container employs sulphuric acid with which the vaporized mercury reacts forming mercury sulphate.

7 Claims, 2 Drawing Sheets

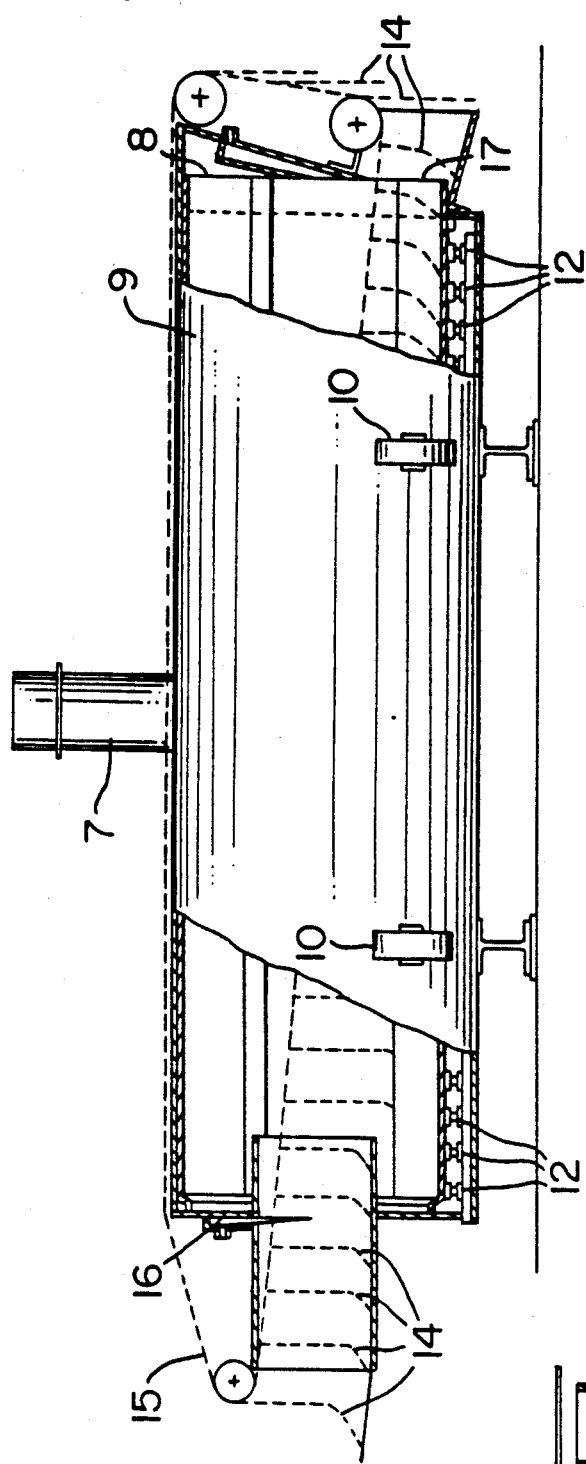
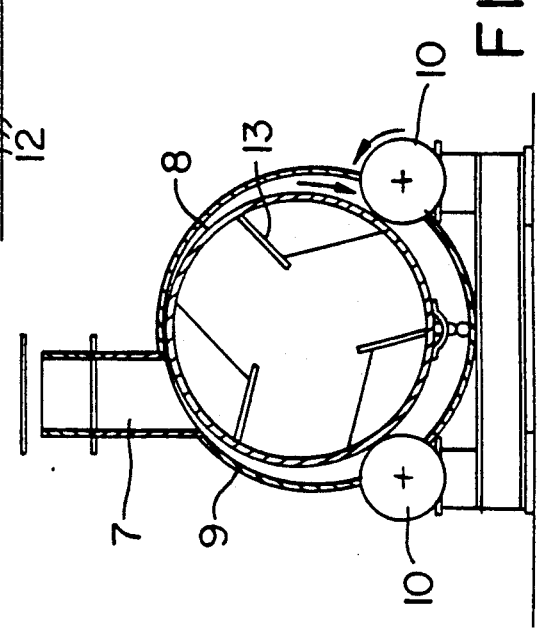

METHOD OF PROCESSING USED APPLIANCE BATTERIES

BACKGROUND OF THE INVENTION

The present invention relates to a method and apparatus for processing used batteries.

Appliance batteries in the form of galvanic elements which are used to operate portable electrical appliances such as radios, recorders, cameras, etc., are being used in ever-increasing quantities. At the same time, therefore, there is also an increase in the incidence of used appliance batteries, the disposal of which is becoming a tremendous problem due to the metals and metal salts which they contain.

Disposing of appliance batteries on refuse dumps constitutes a substantial environmental hazard, while disposing of them on special refuse tips is very expensive and is not an acceptable solution to the problem, on account of the vast quantities involved.

SUMMARY OF THE INVENTION

It is an object of the present invention to provide a novel, favorably-costed treatment process by which these enormous quantities of appliance batteries can be separated into their constituent parts, the metals on the one hand and also the synthetic plastics and graphite electrodes which they contain being recovered so that they can be recycled and used again.

According to the invention, this and other objects are attained by a method of treating used appliance batteries by a thermal mechanical treatment wherein the batteries are heated in a closed container to a temperature at which, possibly under the action of mechanical pressure and/or impact, the metal-synthetic plastics material and the metal-metal bonds become detached so that the metal parts can then be separated from the synthetic plastics parts by applying conventional separation methods.

The substantially different thermal expansion coefficients of the metal parts on the one hand and parts of synthetic plastics on the other can result in a surprisingly rapid separation of the metals from the synthetic plastics, the great difference in specific weight being utilised for the purpose of separation. For example, the metal and synthetic plastics materials present can be separated from one another in a liquid in which the synthetic plastics parts float while the metal parts on the other hand sink. Alternatively, wind or air blast sifting is possible and ensures a satisfactory separation of metal and synthetic plastics material.

Where these used appliance batteries are concerned, a quite substantial problem which remains is the presence of mercury which is contained in a multiplicity of such batteries. In the light of this mercury content, it has been found expedient for the thermal treatment of the batteries to be carried out in a container under an inert gas atmosphere. Nitrogen in particular has been found to be very suitable as such an inert gas atmosphere. This inert gas atmosphere prevents oxidation of the metal parts during heating and furthermore products of decomposition and other volatile constituents which occur during heating, particularly mercury, are prevented from escaping into the atmosphere.

According to an advantageous embodiment of the method according to the invention, therefore, the inert gas emerging from the container is cooled and washed with sulphuric acid in a washing plant.

During this washing process, the mercury is dissolved in the sulphuric acid and forms mercury sulphate.

Once it has been washed and possibly after it has been first heated, the inert gas is recirculated back to the container and is therefore used again.

In an e.g. adjacent electrolysis plant, the mercury sulphate solution occurring is converted back to metallic mercury and sulphuric acid, and the sulphuric acid possibly together with any other products of decomposition of the synthetic plastics contained therein is fed back to the washing plant.

The mercury retrieved in the electrolysis plant is in a pure form and is thus available for re-use without poisoning the environment.

Ideally, the used appliance batteries are heated in an externally heated rotating container. For heating, it is possible for example to use burners operated on fuel oil or liquid gas.

A particularly advantageous embodiment of the method according to the invention uses for heating the appliance batteries a high frequency e.g. R-F heating which ensures controlled heating of the metal parts and their rapid detachment from the synthetic plastics parts.

A further advantageous method of heating the appliance batteries in the container resides in that the batteries are heated by a stream of heated inert gas which is passed through the container. With this method, the inert gas is expediently circulated and heated to working temperature by an electrical heating source or by a correspondingly dimensioned heat exchanger before it enters the container.

Upon entering the reaction container, the inert gas gives off its thermal energy substantially to the appliance batteries which are to be heated and it then leaves the reaction vessel together with any volatile products of decomposition which may possibly have formed and also with the mercury contained in the batteries.

The inert gas emerging from the container is then cooled and washed with sulphuric acid in a column provided with Raschig rings or the like and then, after being reheated, it is fed back to the reaction container.

The mercury sulphate solution formed in the washing plant is then converted to mercury and sulphuric acid in an electrolysis plant, the sulphuric acid being returned to the washing plant while the mercury is obtained in pure form.

It has been found expedient if the appliance batteries are either prior to introduction into the container or during treatment, subjected to a mechanical pressure and/or impact treatment which represents a substantial aid to separation into their constituent parts. For example, the batteries can be subjected to a pressure treatment so that the outer casing bursts and the materials present in the interior become readily accessible.

On the other hand, such a mechanical treatment of the appliance batteries can be achieved also by rotation of the container, aided for instance by hammer means contained therein, so that the separation into constituent parts is substantially assisted.

For treating the appliance batteries in the container, a temperature in the range from 150° to 190° C. has been found to be particularly advantageous.

Substances such as carbon electrodes and metal compounds, particularly manganese oxide, which in the case of the method according to the invention are liberated following separation of the metal parts, synthetic plastics parts and toxic mercury, are separated and subjected to a wet treatment method such as is known for the processing of sludges which contain metals. It causes the metal compounds to pass into solution and the metals can easily be recovered by an ion exchange process (See for example DOS 38 21 242).

Apparatus for carrying out the method according to the invention consists of a heatable container provided with a closable loading aperture and removal orifice and which is provided with feed and discharge means for inert gas and, working with sulphuric acid, a gas washing apparatus for the inert gas leaving the container and adjacent to which there is an electrolysing apparatus.

The container is thereby expediently constructed as a rotary tube container having in its interior conveyor blades for circulating the appliance batteries or also steel balls and the like which are circulated at the same time and which, like a ball mill, shatter the used batteries fed into the apparatus and so assist the treatment process.

For heating the materials fed into the rotary tube container it is possible on the one hand for this rotary tube container to be disposed for rotation in a heating jacket in which gas or oil burners are provided for heating the rotary tube contents. Instead of this external heating, it is also possible for the inert gas introduced into the rotary tube container to be used for heating the batteries in the apparatus. For this purpose, the inert gas is for example continuously circulated through the container and the subsequent washing apparatus which works with sulphuric acid and the inert gas which is in this way cleansed of mercury and other possible products of decomposition and other volatile constituents is passed through a heating apparatus in which it is heated to working temperature and then returned to the container where it gives off its thermal energy to the batteries which are to be processed.

For heating the inert gas, it is possible either to provide an electrical heating device or another correspondingly constructed heat exchanger may be used.

An apparatus in which a high frequency heating arrangement is used to heat up the old batteries has been found to be particularly advantageous. The container in the case of such an embodiment is expediently produced from a ceramic material and has on its outer wall appropriately constructed high frequency heaters which transfer energy preferentially to the metal parts so providing for controlled heating of them and thus for a rapid breakdown of the metal-plastics bonds.

The invention will now be described in more detail by way of example only with reference to the accompanying drawings.

BRIEF DESCRIPTION OF THE DRAWINGS

FIG. 2 is a partially sectional side view of an apparatus consisting of a rotary tube container; and FIG. 3 is an end view of the apparatus shown in FIG. 1.

DETAILED DESCRIPTION OF THE PREFERRED EMBODIMENTS

Figure 1:
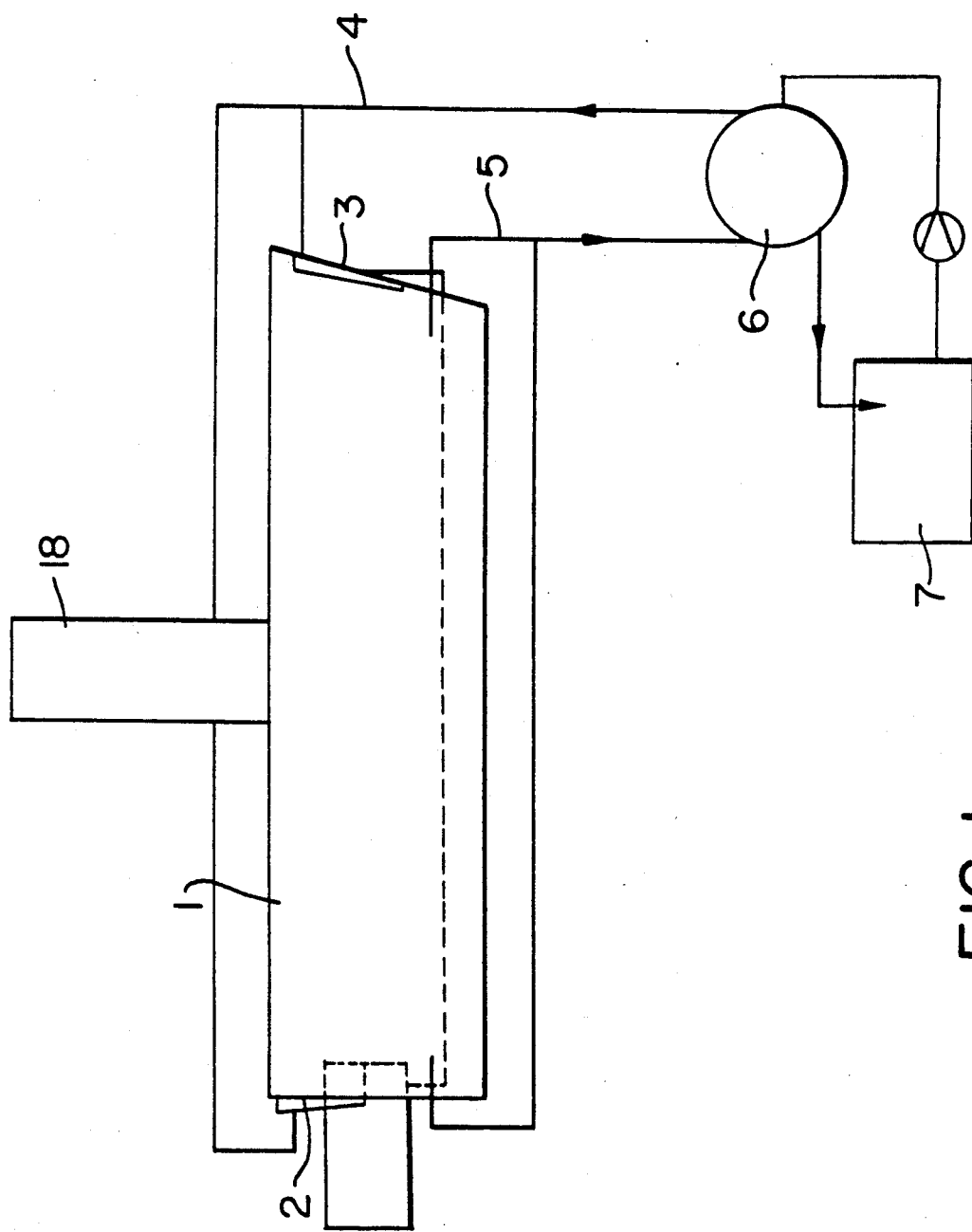
FIG. 1 is a diagrammatic view of apparatus according to the invention for the processing of used appliance batteries.

In the case of the apparatus shown in FIG. 1, the externally heated rotary tube 1 is filled through a loading air lock 2 with appliance batteries which are to be processed while synthetic plastics waste and metal waste separated by the thermal treatment leave the rotary tube through an air lock 3. These wastes are separated in a separate plant. The same applies to graphite electrodes and metal compounds which are further treated by a wet process.

Nitrogen introduced as an inert gas into the rotary tube both via the air lock 2 and also the air lock 3, through the pipe 4, absorbs mercury vapours and any products of decomposition and in a laden form leaves the rotary tube through pipe 5 and passes to a washing apparatus 6 in which the nitrogen gas is washed with sulphuric acid in a column and is freed from mercury. Cleaned in this way, the nitrogen is fed back to the rotary tube container 1 through the pipe 4.

Mercury sulphate produced in the washing apparatus 6 is passed to an electrolysing apparatus 7 where the mercury is recovered in a pure form by electrolysis while the sulphuric acid reformed is returned to the gas washing apparatus 6.

Losses of nitrogen originating from leaks in the apparatus are automatically compensated by the addition of fresh nitrogen.

Heating of the rotary tube container 1 is accomplished by means of gas or oil burners, not shown, the waste gases from combustion escaping through the chimney 18.

In the apparatus shown in FIGS. 2 and 3, container 8 is constructed as a rotary tube and is rotatably disposed in an outer shell 9 on pairs of roller bearings 10 and 11. Gas burners 12 heat the container 8 which has in its interior guide blades 13 the action of which ensures that the material to be processed, when it has been fed into the machine, is constantly circulated during rotation.

Furthermore, for mechanical treatment of the material to be processed, a revolving chain 15 provided with short chain ends 14 is passed through the container 8 so ensuring a mechanical treatment of the material.

The appliance batteries which are to be processed are introduced through a feed aperture 16 and they leave the rotary tube container 8 in the form of metal parts and synthetic plastics parts and graphite electrodes and other metal compounds through the outlet orifice 17. They are then separated into the specifically heavier metals and the specifically lighter synthetic plastics materials by sedimentation in suitable liquids or by a wind or air blast sifting process. Graphite materials are separated and metal compounds are brought into solution and processed by an ion exchange process.

In the apparatus shown in FIGS. 2 and 3, the interior of the container 8 is completely isolated from the space formed by the outer shell 9 in which the gas burners 12 provide the necessary heating. The feed aperture 16 and the discharge orifice 17 of the container 8 are provided with air locks. Both air locks, charged with nitrogen, have a slight above-atmospheric pressure, this overpressure being capable of expanding in the direction of the inner drum because a negative or reduced pressure is provided therein. In this way, the interior of the rotating container 8 is kept completely isolated from the outside environment. The outside air and the oxygen in it do not therefore pass into the interior so that oxidation of the metals is prevented while on the other hand the nitrogen introduced into the container 8, once it has been charged with the mercury and the products of decomposition cannot pass from the interior out into the atmosphere either, so that there is no pollution of the environment.

I claim:

1. A method of processing used appliance batteries including metal parts and synthetic plastics parts by a thermal-mechanical treatment, wherein the batteries are heated in a closed container to a temperature at which, with the assistance of one of mechanical pressure, impact action and a combination thereof, metal-plastics and metal-metal bonds are weakened or destroyed and then the metal parts are separated from the synthetic plastics parts by conventional physical methods of separation, wherein the thermal treatment of the batteries is performed in the container under an inert gas atmosphere and wherein heating of the appliance batteries is carried out by an inert gas which is passed through the container and, after the inert gas leaves the container, it is cooled and washed with sulphuric acid.

2. A method according to claim 1, wherein mercury sulphate formed in the gas washing is converted by electrolysis into mercury and sulphuric acid, and the sulphuric acid is re-used for washing.

3. A method according to claim 1, wherein nitrogen is used as the inert gas.

4. A method according to claim 1 wherein the appliance batteries are heated to a temperature in the range from 150° to 190° C.

5. A method according to claim 1, wherein carbon electrodes and metal compounds remaining after separation of the metals and synthetic plastics materials are subjected to a wet process.

6. A method of processing used appliance batteries including metal parts and synthetic plastics parts by a thermal-mechanical treatment, wherein the batteries are heated in a closed container to a temperature at which, with the assistance of one of mechanical pressure, impact action and a combination thereof, metal-plastics and metal-metal bonds are weakened or destroyed and then the metal parts are separated from the synthetic plastics parts by conventional physical methods of separation, wherein heating of the appliance batteries is conducted in the container which is externally heated and rotated.

7. A method of processing used appliance batteries including metal parts and synthetic plastics parts by a thermal-mechanical treatment, wherein the batteries are heated in a closed container to a temperature at which, with the assistance of one of mechanical pressure, impact action and a combination thereof, metal-plastics and metal-metal bonds are weakened or destroyed and then the metal parts are separated from the synthetic plastics parts by conventional physical methods of separation, wherein heating of the appliance batteries is accomplished by high frequency energy.

* * * * *